United States Patent

Gruel

[19]

[11] Patent Number: 5,887,546
[45] Date of Patent: Mar. 30, 1999

[54] LITTER BOX SHELL

[76] Inventor: Suzette C. Gruel, 219 N. Marshall St., Lancaster, Pa. 17602

[21] Appl. No.: 608,364

[22] Filed: Feb. 28, 1996

[51] Int. Cl.$^6$ ........................................................ A01K 1/01
[52] U.S. Cl. ............................................................ 119/165
[58] Field of Search .................................. 119/28.5, 165, 119/484; 217/36, 40, 42

[56] References Cited

U.S. PATENT DOCUMENTS

| | | | |
|---|---|---|---|
| D. 203,929 | 3/1966 | Lowe, Jr. ................................... | D12/2 |
| D. 248,333 | 6/1978 | Haugen ..................................... | D30/41 |
| D. 276,752 | 12/1984 | Kinzie ...................................... | D30/99 |
| 2,144,329 | 1/1939 | Conlon et al. . | |
| 2,741,223 | 4/1956 | Winborn, Jr. . | |
| 2,939,620 | 6/1960 | Royce ....................................... | 217/40 |
| 3,085,550 | 4/1963 | Crawford . | |
| 3,141,441 | 7/1964 | Russell . | |
| 3,310,031 | 3/1967 | Lowe, Jr. . | |
| 3,552,356 | 1/1971 | Rosenthal ............................... | 119/28.5 |
| 3,890,931 | 6/1975 | Saver . | |
| 5,092,270 | 3/1992 | Simons et al. ....................... | 119/165 X |
| 5,129,364 | 7/1992 | Pirkle ...................................... | 119/167 |
| 5,311,837 | 5/1994 | Mamer-Boellstorff ................. | 119/28.5 |
| 5,361,725 | 11/1994 | Baillie et al. ........................... | 119/165 |
| 5,575,239 | 11/1996 | Bradburn et al. .................... | 119/484 X |

OTHER PUBLICATIONS

High Wall Wizard, Oct. 1995 / Cats.

*Primary Examiner*—Michael J. Carone
*Assistant Examiner*—Elizabeth Shaw
*Attorney, Agent, or Firm*—Norman E. Lehrer

[57] ABSTRACT

A litter box shell for receiving at least one litter box therein comprises a substantially rectangularly shaped housing. The housing incudes a bottom wall, two opposing side walls, two opposing end walls and an open top. One of the opposing side walls has an opening formed therein which is of a sufficient size to allow a cat to pass therethrough. Each of the end walls includes a handle located adjacent the open top for facilitating the lifting and transporting of the litter box shell.

8 Claims, 2 Drawing Sheets

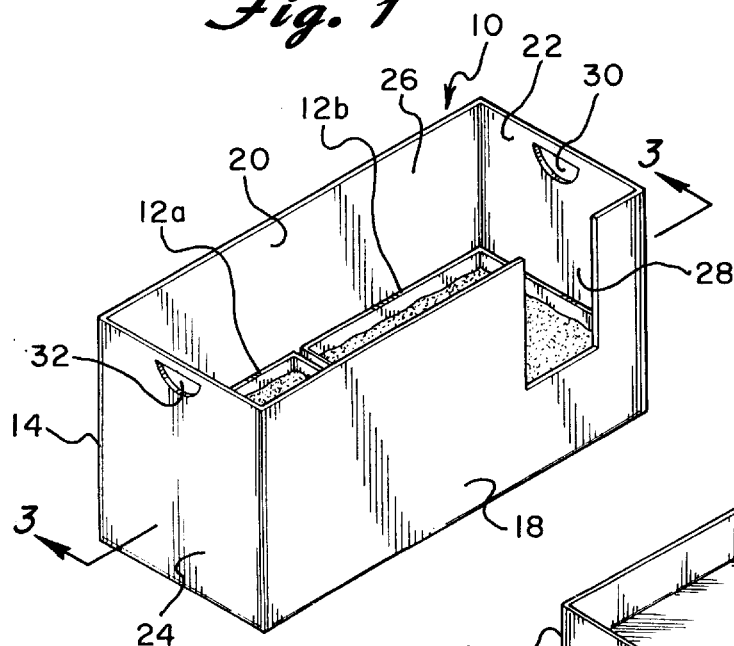
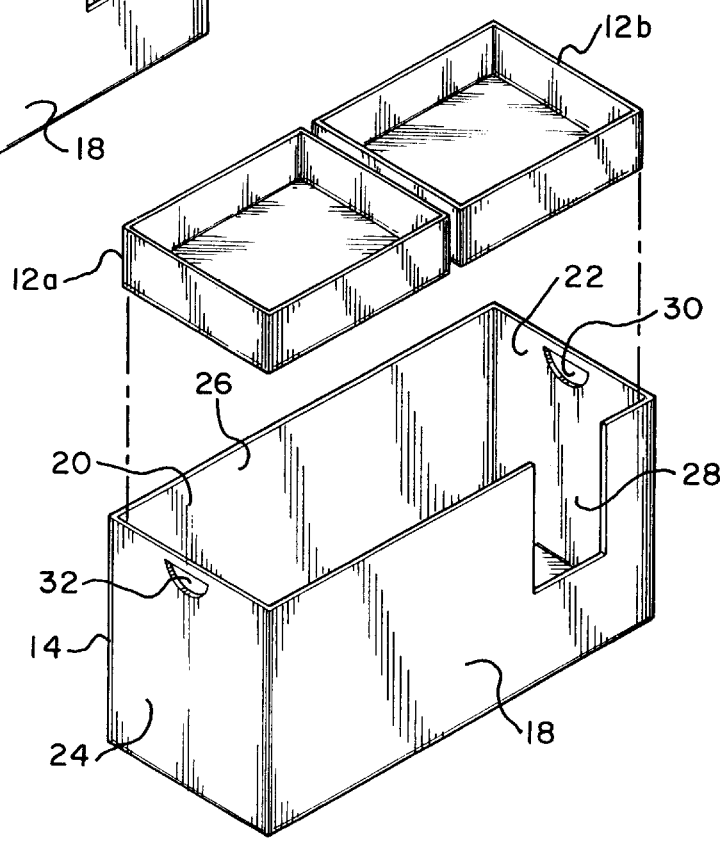
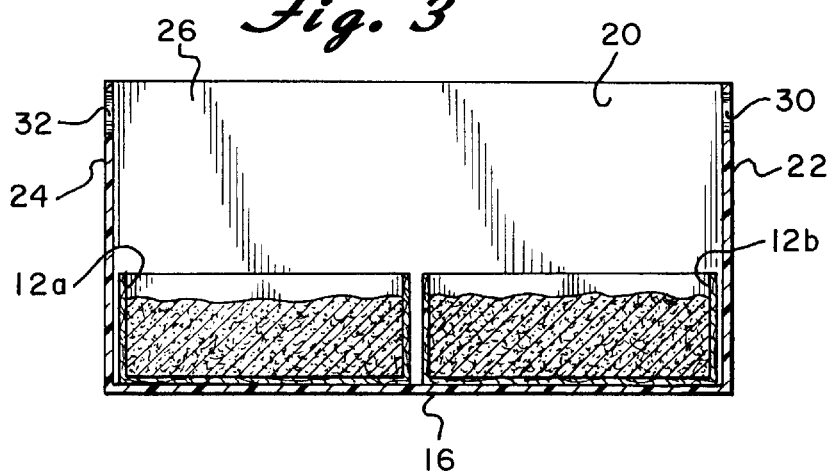

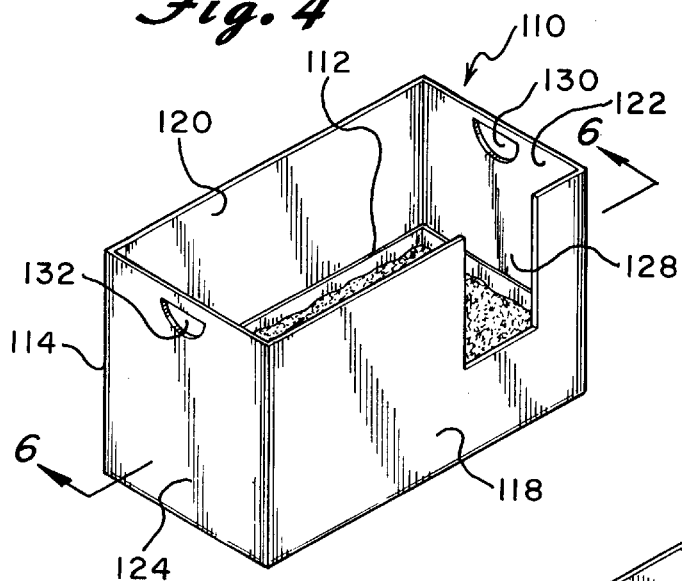
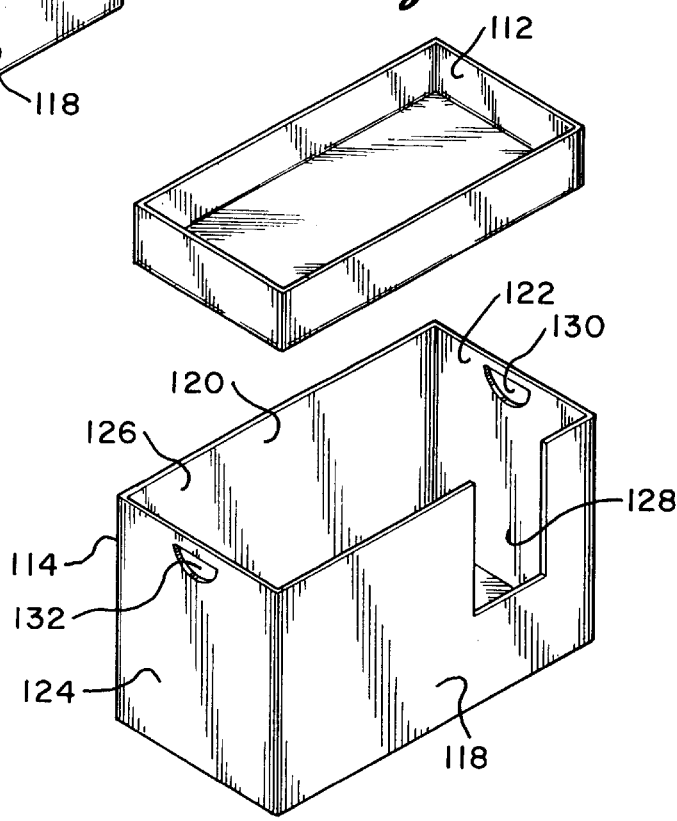
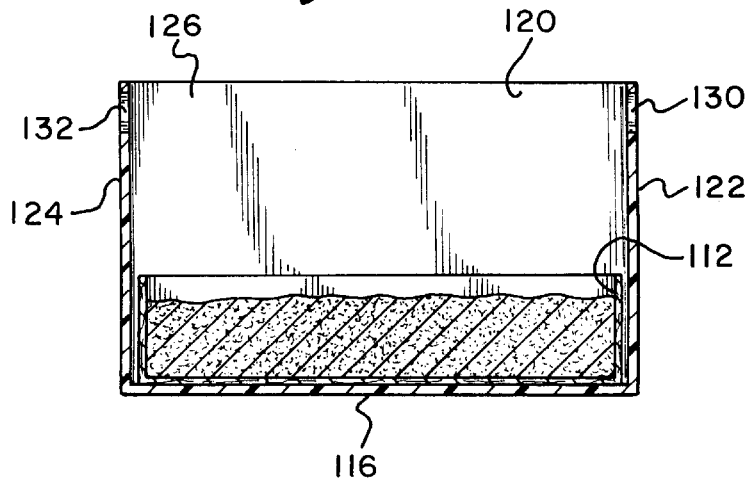

LITTER BOX SHELL

BACKGROUND OF THE INVENTION

The present invention is directed toward a litter box shell and, more particularly, to such a litter box shell that is designed to receive one or more litter boxes therein and prevent litter from exiting the same.

Litter boxes are provided for the normal daily care of indoor cats. Litter boxes typically include a bottom wall, opposing side and end walls, and an open top. Before use, litter, which is comprised of a plurality of loose granular particles, is poured into the litter box. An undesirable consequence associated with most litter boxes is that cats often kick litter over the walls of the litter box and onto the floor both before and after use. Accordingly, the pet owner is constantly picking up the loose particles of litter that have been scattered on the floor. Furthermore, many cats are exceedingly shy and are uncomfortable with using a completely open litter box while people are present.

In recognition of the foregoing, closed litter boxes have been proposed that include a bottom wall, encircling side walls which extend upwardly from the bottom wall, and a top cover portion. At least one of the side walls has an opening formed therein for allowing a cat to enter or exit the litter box. See, for example, U.S. Pat. Nos. 4,940,016, 5,129,364, 5,178,100, 5,211,134 and U.S. Design Pat. Nos. 248,333 and 276,752. Such litter boxes are effective in reducing the amount of litter that can be thrown from the same. However, most cats do not prefer closed litter boxes because odors get trapped therein and cats are very clean, particular animals. Furthermore, it is difficult to clean these substantially closed boxes.

Litter boxes have also been proposed that include a bottom wall, an open top, and two or three walls of a height sufficient to somewhat reduce the amount of litter that can be thrown from the same. See, for example, U.S. Pat. Nos. 3,310,031, 3,890,931, U.S. Design Pat. No. 203,929 and an advertisement in the October 1995 issue of *Cats*. While the higher side walls in each of these proposed litter boxes may lessen the amount of litter that could be scattered onto the floor by a cat, each has an opening formed in at least one of the walls which is large enough to allow a significant amount of litter to be kicked from the litter box. Another problem associated with these litter boxes is that they are cumbersome to lift and transport when it is time to remove old litter therefrom and clean the interior of the same.

SUMMARY OF THE INVENTION

The present invention is designed to overcome the deficiencies of the prior art discussed above. It is an object of the invention to provide a litter box shell that is adapted to receive a litter box therein.

It is a further object of the invention to provide such a litter box shell which includes means to substantially reduce the amount of litter that can be thrown from the same.

It is yet another object of the invention to provide a litter box shell that is easy to transport for cleaning.

It is still another object of the invention to provide a litter box shell which is relatively easy and inexpensive to manufacture.

In accordance with the illustrative embodiments, demonstrating features and advantages of the present invention, there is provided a litter box shell for receiving at least one litter box therein. The litter box shell comprises a substantially rectangularly shaped housing which has a bottom wall, two opposing side walls, two opposing end walls and an open top. One of the opposing side walls has an opening formed therein. The opening is of a sufficient size to allow a cat to pass therethrough. Each of the end walls includes handle means for facilitating the transportation of the litter box shell.

Other objects, features and advantages of the invention will be readily apparent from the following detailed description of preferred embodiments thereof taken in conjunction with the drawings.

BRIEF DESCRIPTION OF THE DRAWINGS

For the purpose of illustrating the invention, there is shown in the accompanying drawings forms which are presently preferred; it being understood that the invention is not intended to be limited to the precise arrangements and instrumentalities shown.

FIG. 1 is a perspective view of the litter box shell of the present invention showing two litter boxes positioned therein;

FIG. 2 is view similar to FIG. 1 showing the two litter boxes positioned above the litter box shell;

FIG. 3 is a cross-sectional view taken along lines 3—3 of FIG. 1;

FIG. 4 is a perspective view of an alternate litter box shell designed to accommodate one litter box;

FIG. 5 is a view similar to FIG. 4 showing the litter box above the shell, and

FIG. 6 is a cross-sectional view taken along lines 6—6 of FIG. 4.

DETAILED DESCRIPTION OF THE PREFERRED EMBODIMENT

Referring now to the drawings in detail wherein like reference numerals have been used throughout the various figures to designate like elements, there is shown in FIGS. 1–3 a litter box shell constructed in accordance with the principles of the present invention and designated generally as 10.

The litter box shell 10 is adapted to receive two litter boxes 12a and 12b therein. The litter box shell includes a substantially rectangularly shaped housing 14. In the preferred embodiment, the housing has a bottom wall 16, two opposing side walls 18 and 20, two opposing end walls 22 and 24 and an open top 26. Preferably, the bottom wall 16 is solid so as to prevent liquid from leaking therethrough. The preferred material for the housing 14 is plastic and is from about 80 cm to about 115 cm long, from about 30 cm to about 45 cm wide, and from about 20 cm to about 40 cm high. However, the housing can be comprised of a variety of other materials and can be of different sizes.

In the embodiment shown in FIGS. 1–3, the side wall 18 has an opening 28 formed therein. The opening preferably extends downwardly from the open top 26 of the housing 14 to a point above the bottom wall 16 thereof. It should be readily apparent that the opening could be formed in the side wall 20. The opening 28 is of a sufficient size to allow a cat to pass therethrough. Specifically, the opening is preferably from about 10 cm to about 15 cm wide and begins at a point from about 10 to about 15 cm above the bottom wall 16 of the housing 14.

Each of the opposing end walls 22 and 24 of the housing 14 includes handles in the form of holes 30 and 32, respectively, formed therethrough adjacent the open top 26.

The holes allow a pet owner to easily pick up and transport the litter box shell 10. It should be noted that the holes could be replaced with other handle means to facilitate the lifting of the litter box shell.

In use, the litter boxes 12a and 12b are positioned in the litter box shell 10. A cat (or cats) can freely enter the shell through the opening 28 in the side wall 18. When it is time to clean out the litter boxes, the pet owner lifts the litter box shell 10, together with the litter boxes 12a and 12b positioned therein, by inserting his or her hands through the holes 30 and 32 in the end walls of the housing. The pet owner then transports the litter box shell outside (or to another desired location). The litter boxes 12a and 12b are then removed from the litter box shell. Thereafter, the shell is turned upside down in order to remove any litter particles that have been kicked onto the bottom wall 16 of the housing 14 by the cats. Since the litter box shell is preferably comprised of plastic, it can be readily washed out with water and/or other cleaning compositions.

In the embodiment shown in FIGS. 4–6, a similar litter box shell 110, which is designed to receive only one litter box 112 therein, is disclosed. The shell 110 includes a housing 114 which has a bottom wall 116, two opposing side walls 118 and 120, two opposing end walls 122 and 124 and an open top 126. The litter box shell 110 is preferably comprised of plastic and is from about 40 cm to about 60 cm long, from about 30 cm to about 45 cm wide, and from about 20 cm to about 40 cm high. The litter box shell 110 has an opening 128 formed in the side wall 118. The opening 128 is preferably from about 10 cm to about 15 cm wide and begins at a point from about 10 to about 15 cm above the bottom wall 116 of the housing 114. The litter box shell 110 is used in substantially the same manner as described above.

The present invention may be embodied in other specific forms without departing from the spirit or essential attributes thereof and accordingly reference should be made to the appended claims rather than to the foregoing specification as indicating the scope of the invention.

What is claimed is:

1. The combination of a litter box shell and a litter box comprising: a litter box shell including a substantially rectangularly shaped housing including a bottom wall, two opposing side walls, two opposing end walls and an open top, only one of said opposing side walls having an opening formed therein, said opening extending downwardly from said open top of said housing to a point above said bottom wall and being of a sufficient size to allow a cat to pass therethrough, each of said opposing end walls including a handle means for facilitating the lifting and transporting of said litter box shell and at least one litter box within said litter box shell, said litter box having a quantity of cat litter particles contained therein.

2. The combination of a litter box shell and litter box of claim 1 wherein said housing is comprised of plastic.

3. The combination of a litter box shell and litter box of claim 1 wherein each of said handle means includes a hole formed through a corresponding one of said end walls, each of said holes being positioned adjacent said open top of said litter box shell.

4. The combination of a litter box shell and litter box of claim 1 wherein said housing is from about 40 cm to about 60 cm long, from about 30 cm to about 45 cm wide, and from about 20 cm to about 40 cm high.

5. The combination of a litter box shell and litter box of claim 4 wherein said opening in said side wall is from about 10 cm to about 15 cm wide, and begins from a point from about 10 to about 15 cm above said bottom wall of said housing.

6. The combination of a litter box shell and litter box of claim 1 wherein said housing is from about 80 cm to about 115 cm long, from about 30 cm to about 45 cm wide, and from about 20 cm to about 40 cm high.

7. The combination of a litter box shell and litter box of claim 6 wherein said opening in said side wall is from about 10 cm to about 15 cm wide, and begins at a point from about 10 to about 15 cm above said bottom wall of said housing.

8. The combination of a litter box shell and litter box of claim 7 wherein said litter box shell includes two litter boxes within said shell, each of said litter boxes having an open top and containing a quantity of cat litter particles contained therein.

\* \* \* \* \*